Patented May 9, 1939

2,157,991

UNITED STATES PATENT OFFICE 2,157,991

PREPARATION OF VAT DYESTUFFS OF THE ANTHRAQUINONE SERIES

Walter Mieg and Franz Wieners, Opladen, and Willy Burneleit, Cologne, Rhine, Germany, assignors to General Aniline Works, Inc., New York, N. Y., a corporation of Delaware No Drawing. Application December 23, 1935, Serial No. 55,928. In Germany December 29, 1934

3 Claims. (Cl. 260—272)

The present invention relates to the preparation of vat dyestuffs of the anthraquinone series and to the products which are obtainable thereby.

We have found that valuable dyestuffs of the anthraquinone series can be obtained by heating with copper a compound of the following general formula: Aryl.CO.NR.Aryl, wherein at least one of the aryl residues represents an anthraquinoid residue and both residues contain a halogen atom in ortho-position to the CO- and NR-group respectively, and R stands for hydrogen or a hydrocarbon radical such as an alkyl group.

The reaction can be performed in the presence of solvents or diluents, solvents which are capable of forming addition products with copper salts being preferably employed. Examples for such solvents are tertiary amines such as quinoline or pyridine.

The products which are obtainable in accordance with our present invention probably correspond to the phthaloyl phenanthridone type. They are valuable vat dyestuffs and can also be employed as intermediates for the preparation of other vat dyestuffs. Most of them are new, for instance, the compounds of the following formula:

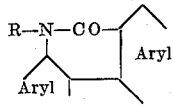

wherein at least one of the aryl nuclei is an anthraquinoid nucleus and R stands for a hydrocarbon radical such as an alkyl group, or the compounds of the following type

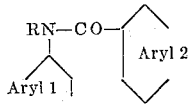

wherein aryl 1 stands for an aromatic nucleus other than an anthraquinoid nucleus, aryl 2 stands for an anthraquinoid nucleus and R stands for hydrogen or an alkyl group.

It is to be understood that the symbol

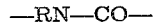

covers also the tautomeric form

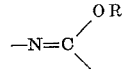

The possibilities indicated in Examples 12–17, wherein the molecule contains several phthaloyl phenanthridone groups are intended to fall within the scope of our claims. The nature of the substituent represented by R is immaterial for the properties of our dyestuffs; lower alkyl groups such as methyl or ethyl being preferably employed.

The following examples illustrate the invention without, however, restricting it thereto the parts being by weight:

Example 1

10 parts of 1-(o-bromobenzoyl)-methylamino-2-bromoanthraquinone and 10 parts of copper powder are boiled for 8 hours while stirring in 40 parts of nitrobenzene. After cooling the reaction product is sucked off and freed from copper by boiling with hydrochloric acid and a copper chloride solution. The dyestuff is recrystallized from nitrobenzene. It represents yellow needles and dissolves in concentrated sulfuric acid with orange red coloration. It is free from halogens and is not saponified by sulfuric acid. The new dyestuff which has the following constitution:

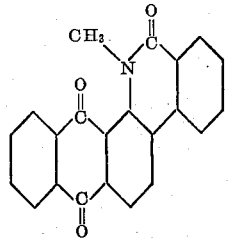

dyes cotton from the Bordeaux red vat even greenish-yellow shades.

Example 2

35 parts of 1-(o-bromobenzoyl)-methylamino-2-bromoanthraquinone and 35 parts of copper are heated while stirring in 90 parts of quinoline at 220° C. for 1 hour. The reaction product which is formed thereby is isolated as described in Example 1. It is obtained in a pure state and is identic with the product obtained according to Example 1.

Example 3

A solution of 15 parts of 1-(5-nitro-2-bromobenzoyl) methylamino - 2 - bromoanthraquinone in 60 parts of nitrobenzene is boiled for 24 hours with 15 parts of copper. The reaction product crystallizes in yellow needles and is isolated as described in Example 1. It dissolves in sulfuric acid with a yellow coloration its constitution being:

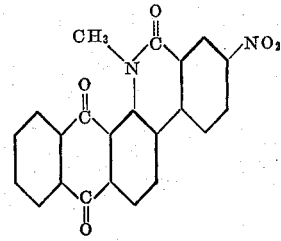

Example 4

A solution of 20 parts of 1-(5-nitro-2-chlorobenzoyl)-methylamino-2-bromoanthraquinone in 80 parts of nitrobenzene is boiled with 20 parts of copper powder for 9 hours while stirring. The product which is isolated as described in Example 1 is identic with the product obtained according to Example 3.

When reducing the nitro group, for instance by means of sodium hydrosulfite, the corresponding amino compound is obtained, the well crystallizing N-benzoyl derivative of which dyes cotton even reddish-yellow shades.

Example 5

6 parts of 2-(5-nitro-2-bromobenzoyl)-methylamino-1-chloroanthraquinone and 6 parts of copper are dissolved in 30 parts by volume of quinoline. After heating to 170° C. for ½ hour while stirring a product is obtained which crystallizes in form of yellow needles. It is isolated as described in Example 1. It can be reduced by means of hydrosulfite to the corresponding amino compound, which crystallizes in needles which are soluble in organic solvents with a brownish-red coloration. Its benzoyl derivative dyes cotton orange shades, the constitution being as follows:

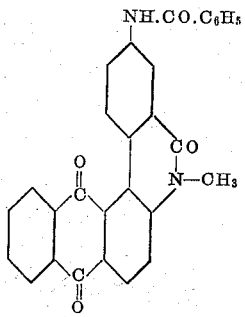

Example 6

A solution of 35 parts of the reaction product from 1 mol of 1-amino-2-bromoanthraquinone and one mol of 2-bromoanthraquinone-1-carboxylic acid chloride in 500 parts of pyridine is heated to boiling for 2 hours with 50 parts of finely dispersed copper. After cooling to 70° C. the dyestuff is sucked off, freed from copper and, if necessary, recrystallized from quinoline or nitrobenzene. Yellow halogen free needles are thus obtained which are not saponified by heating with concentrated sulfuric acid. The dyestuff dyes cotton from a violet dark-brown vat strong golden-yellow shades of good fastness properties. The dyestuff has the following formula:

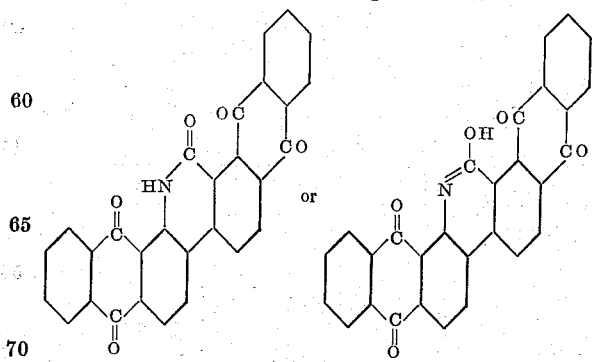

When treating the same with toluene sulfonic acid methyl-ester in the presence of potash a more greenish dyestuff is obtained which has a still better fastness to boiling with a sodium carbonate solution.

Example 7

80 parts of the reaction product from 1 mol of 1-methylamino-2-bromoanthraquinone and 1 mol of 2-bromoanthraquinonyl-1-carboxylic acid chloride are added to a mixture consisting of 500 parts of nitrobenzene, 50 parts of quinoline and 50 parts of pyridine. After the addition of 80 parts of copper powder the solution is stirred at 200° C. until the precipitation of the dyestuff is finished. The dyestuff being isolated in the usual manner the copper is removed therefrom by means of warm dilute nitric acid. The dyestuff thus obtained represents light-yellow needles. It is recrystallized or redissolved from concentrated sulfuric acid. The dyestuff corresponds to the following formula:

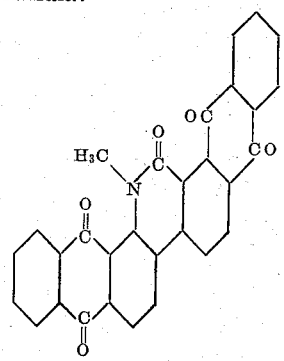

It dyes cotton from a dark-brown vat even clear yellow shades of a strong greenish tint and good fastness properties.

By nitrating and reducing this compound and then causing benzoylchloride to react thereupon a product is obtained which dyes cotton from an alkaline vat even red shades of good fastness properties.

Example 8

A solution of 20 parts of the starting material of Example 7 in 150 parts of quinoline is heated with the equal quantity of finely dispersed copper. After 20 minutes the mixture is cooled to about 100° C. and the reaction product is sucked off. The product obtained is identic with that described in Example 7.

The heating with copper can also be effected at lower temperatures, for instance at 150 or 180° C. while extending the time of reaction. Nitrobenzene can also be employed alone, pyridine and its homologues being also suitable solvents.

Example 9

10 parts of the acylamino compound of 1-methylamido-2-bromoanthraquinone and 1-chloroanthraquinone-2-carboxylic acid chloride are heated with 10 parts of copper powder and 100 parts of quinoline for 1-2 hours while stirring at 175° C. After cooling the precipitating yellow needles are isolated and the copper is removed in the usual manner. The compound thus obtained which has the following formula:

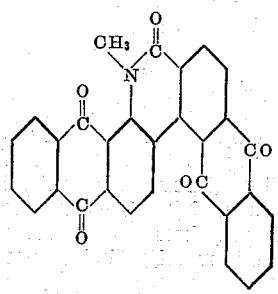

dissolves in cold sulfuric acid with honey-yellow coloration and dyes cotton greenish yellow shades.

Example 10

10 parts by weight of the reaction product from 1-amino-2-bromoanthraquinone and 2-chloroanthraquinone-3-carboxylic acid chloride are added to a mixture of 60 parts of nitrobenzene, 15 parts of pyridine and 13 parts of copper powder and stirred at 130° C. until the precipitation of the dyestuff is finished. It is isolated in the usual manner and recrystallized from quinoline. It has the following constitution:

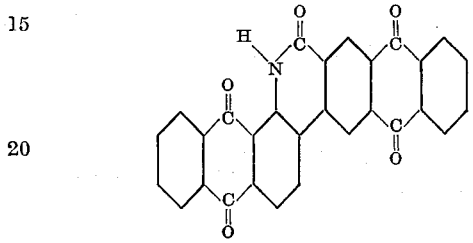

The dyestuff yields from the brown alkaline vat greenish-yellow strong shades of good fastness properties.

Example 11

Into 400 parts of boiling nitrobenzene there are added 60 parts of copper powder and 60 parts of the following compound:

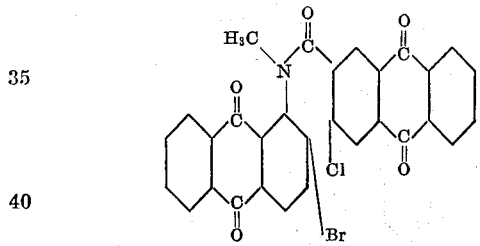

After 12 hours boiling the reaction product is isolated. It represents a halogen free unsaponifiable vat dyestuff of greenish-yellow color and good fastness properties. It corresponds to a 1-.2-.6-.7-diphthaloyl-N-methylphenanthridone.

The same dyestuff is obtained when replacing the nitrobenzene by boiling quinoline the reaction being finished after about 1 hour.

Example 12

A solution of 1 part of the condensation product from 1 mol of 1.4-dimethylamino-2.3-dichloroanthraquinone and 2 mols of 2-chloroanthraquinone-3-carboxylic acid chloride is boiled for 8 hours in a mixture of 10 parts of nitrobenzene, 1.3 parts of pyridine, 0.4 part of quinoline with the addition of 1.3 parts of copper powder. After working up in the usual manner a yellow dyestuff is obtained which corresponds to the following formula:

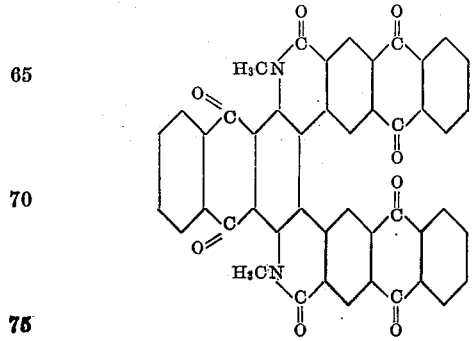

Example 13

A solution of 1 part of the following compound:

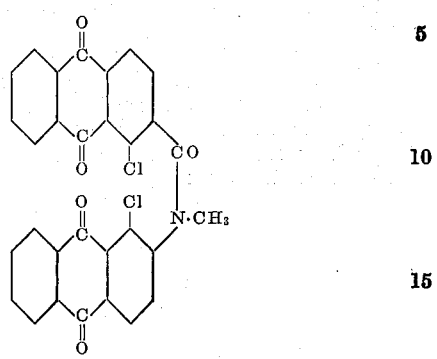

in 10 parts of quinoline with the addition of 1 part of copper is heated to boiling for 1¼ hours. The starting material is transformed into the 3.4.5.6-diphthaloylanthridone the two chlorine atoms being split off. It represents orange crystals which can easily be converted, for instance, by vatting or by treating the yellow solution with metal powders in the presence of concentrated sulfuric acid, into the helianthrone of the following formula:

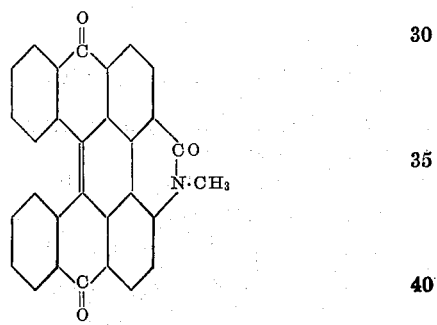

The latter is soluble in concentrated sulfuric acid with a green coloration and yields from a green vat orange shades.

Example 14

A solution of 4 parts of the condensation product from 2-methylamino-1-chloroanthraquinone and 2-bromoanthraquinone-1-carboxylic acid chloride in 7.5 parts of chlorobenzene, 1 part of quinoline and 1 part of pyridine is kept to boiling for 3 hours with the addition of 1.3 parts of copper powder. After isolating the reaction product and removing the copper by recrystallization from quinoline a dyestuff of the following formula is obtained:

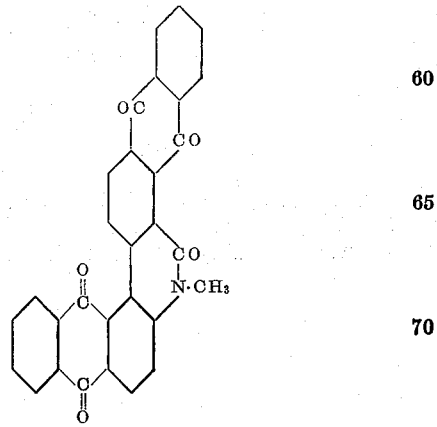

It yields from a bluish-green vat yellow shades.

*Example 15*

The reaction product from 2-methylamino-1-chloroanthraquinone and 2-chloroanthraquinone-3-carboxylic acid chloride is transformed by 3 hours boiling in 10 times its quantity of quinoline in the presence of copper powder into a dyestuff which if recrystallized from quinoline separates in fine yellow needles. The product which is free from halogen corresponds to the following formula:

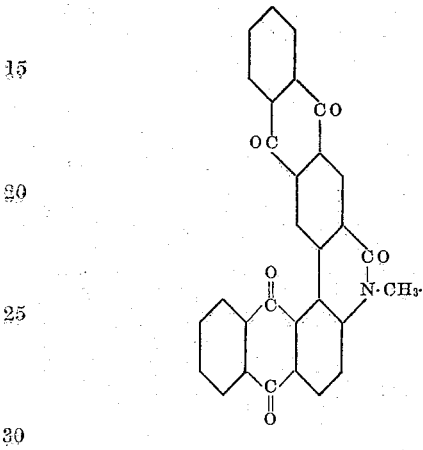

*Example 16*

1 part by weight of the following product

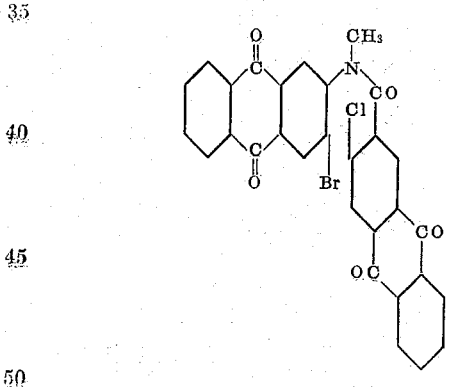

is stirred at 170° C. for 5 or 6 hours in 7 parts of nitrobenzene and 2 parts of pyridine with 1 part of copper powder. After cooling the dyestuff is sucked off, freed from the excess copper and recrystallized from 20 parts of nitrobenzene. The reaction product dyes cotton bright greenish yellow shades.

*Example 17*

A solution of 7.5 parts of a condensation product from 1 mol of 2.5-dibromobenzene-1.4-dicarboxylic acid and 2 mols of 1-methyl-amino-2-bromoanthraquinone in 75 parts of nitrobenzene and 40 parts of quinoline is boiled for about 8 hours with 20 parts of copper powder. After cooling the well crystallized product is sucked off and freed from the excess copper. The dyestuff which corresponds to the following formula:

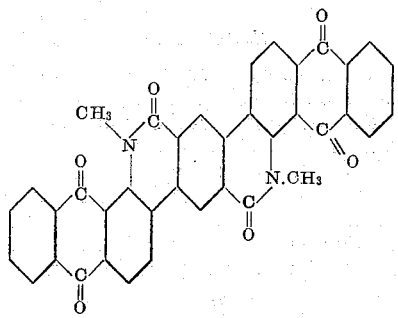

dyes cotton even yellow shades.

*Example 18*

A solution of 23 parts of a condensation product from 1 mol of 2-chloroanthraquinone-3-carboxylic acid and 1 mol of 1-bromo-2-naphthylamine of the following formula:

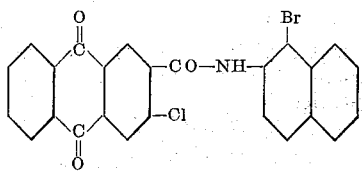

in 130 parts of nitrobenzene and 25 parts of quinoline is boiled while stirring for 2½ hours with 23 parts of copper powder. After cooling the product is sucked off and freed from the excess copper. The dyestuff which corresponds to the following formula:

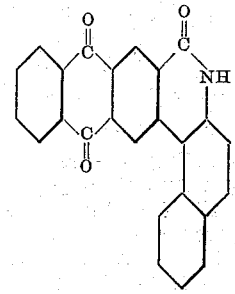

dyes wool even greenish yellow shades.

We claim:—

1. The process which comprises heating with copper a compound of the following general formula Aryl.CO.NR.Aryl wherein aryl represents a carbocyclic aryl radical containing up to three condensed rings at least one aryl radical being an anthraquinonyl radical and both aryl radicals containing a halogen atom in o-position to the CO- and NR-group respectively and R stands for hydrocarbon radicals.

2. The process as claimed in claim 1 wherein the reaction is performed in the presence of a high boiling solvent.

3. The process as claimed in claim 1 wherein the reaction is performed in the presence of quinoline.

WALTER MIEG.
FRANZ WIENERS.
WILLY BURNELEIT.

Certificate of Correction

Patent No. 2,157,991.

May 9, 1939.

WALTER MIEG ET AL.

It is hereby certified that error appears in the printed specification of the above numbered patent requiring correction as follows: Page 1, first column, lines 35 to 39 inclusive, strike out the formula and insert instead the following—

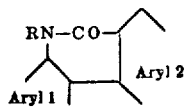

and that the said Letters Patent should be read with this correction therein that the same may conform to the record of the case in the Patent Office.

Signed and sealed this 12th day of September, A. D. 1939.

[SEAL]

HENRY VAN ARSDALE,
*Acting Commissioner of Patents.*